United States Patent Office 3,020,240
Patented Feb. 6, 1962

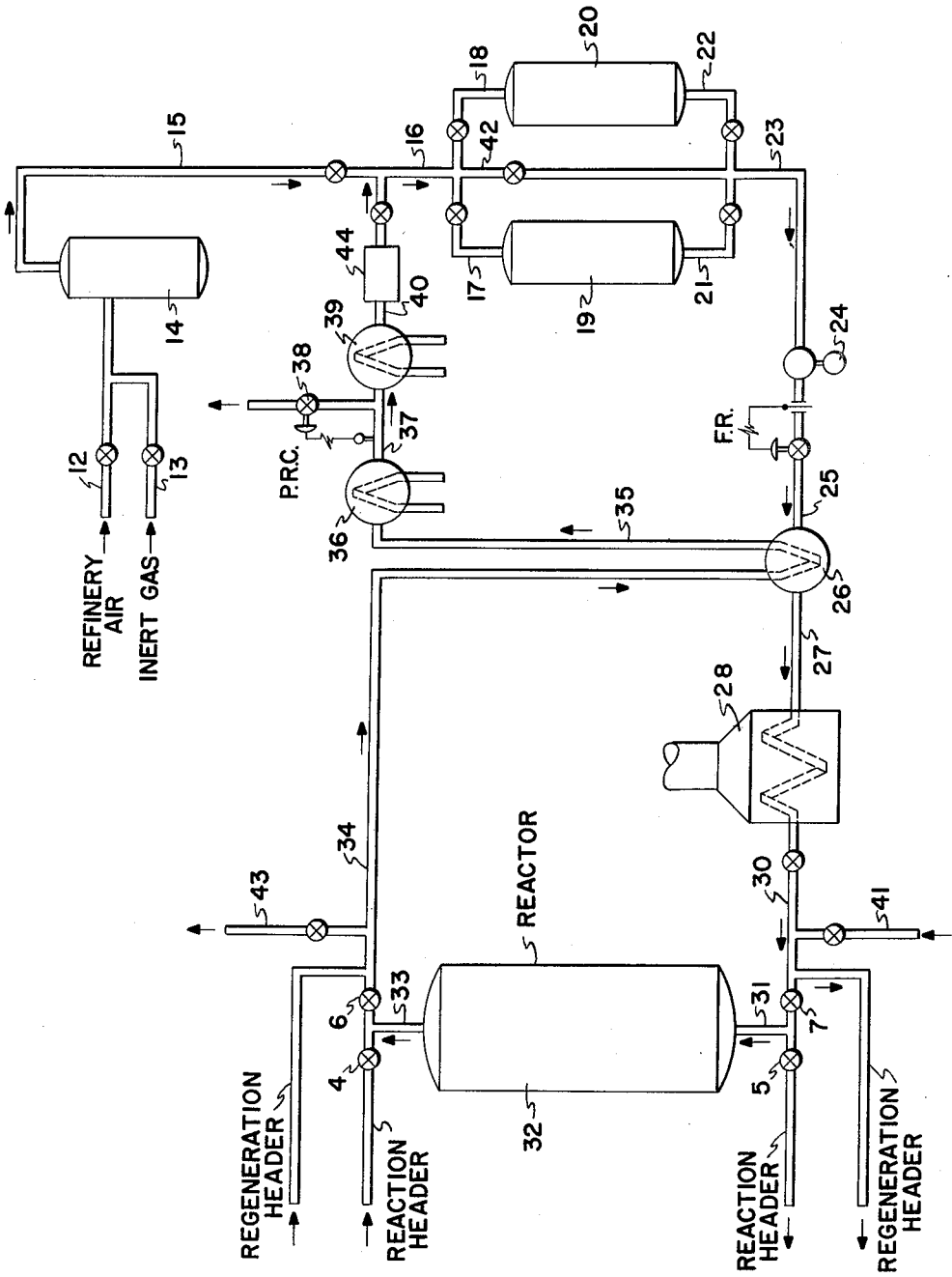

3,020,240
CATALYST REACTIVATION PROCESS
William Lockett, Jr., Westfield, N.J., assignor to Esso Research and Engineering Company, a corporation of Delaware
Filed Dec. 3, 1956, Ser. No. 625,669
7 Claims. (Cl. 252—419)

The present invention relates to improvements in the hydroforming of naphthas. More particularly, it relates to improved hydroforming processes wherein metal oxide-supported noble metal catalysts are reactivated through the combined steps of regeneration, chlorination, and high temperature oxygen treat rejuvenation.

It is a matter of record and commercial practice to hydroform naphthas in the presence of a platinum catalyst. This platinum catalyst is usually supported on a suitable base such as alumina, and may also contain a small amount of acidic, non-metallic promoters or stabilizers such as boric, phosphoric anhydride, silica, halides or organic acids. For instance, a commonly used composition of such catalyst is one containing from 0.001 to 2.0 weight percent platinum, the remainder being the alumina spacing agent or base. Preferred catalysts contain about 0.1 to 0.7 wt. percent of platinum and about 0.5 to about 1.5 wt. percent chlorine. In place of alumina, other bases having mild cracking activity are used. In this hydroforming operation, a naphthenic naphtha is contacted at elevated temperatures and pressures with the catalyst in the presence of added hydrogen. The function of the hydrogen is to repress the formation of carbonaceous deposits on the catalyst.

The operating conditions of the hydroforming operation are pressures in the range of 50 to 1000 p.s.i.g., usually 200 to 700 p.s.i.g. and temperatures in the range of 750°–1050° F., usually 900°–950° F. The hydrogen dilution can vary from about 1000 to 10,000 s.c.f./b.

The feed or charging stock to the hydroforming reactor can be a virgin naphtha, a cracked naphtha, a Fischer-Tropsch naphtha, or the like, and mixtures thereof. The preferred feed is one low in sulfur and unsaturates, especially one which has been passed through a hydrofining operation, although this is not always essential. It is highly desirable, and for best results it is essential to keep the sulfur content of the feed low. For optimum results, i.e. maximum catalyst life and minimum corrosion, sulfur should be below about 0.002% which is lower than most natural or virgin naphthas. However, sulfur content up to 0.06% on feed may be tolerated under some conditions. A typical operating pressure is around 400 p.s.i.g., but pressure may range from 100 to 500 p.s.i.g. or more. Usually it is not desirable to go much above 400 p.s.i.g. Feeds may be light, heavy, or full boiling naphthas as desired. Preferably, however, they should boil in the 150–400° F. range. The feed stock is preheated alone or in admixture with recycle gas to reaction temperature. The endothermic heat of reaction is supplied by preheating the naphtha feed and recycle gas to temperatures substantially above average reaction temperature. Normally two or more fixed bed reactors are used in series with intermediate reheating to maintain an average temperature high enough for the reaction to proceed. The chemical reactions involved in the hydroforming process include dehydrogenation of naphthenes to the corresponding aromatics, isomerization of straight chain paraffins to form branched chain paraffins, isomerization of cyclic compounds such as ethylcyclopentane to form methylcyclohexane, and some aromatization, dealkylation and hydrocracking of paraffins. In a hydroforming operation which is conducted efficiently it is possible with the use of a proper catalyst and proper conditions of operation to hydroform a virgin naphtha having an octane number of about 50 to a hydroformate having an octane number up to as high as 100 and above and to obtain yields of $C_5+$ hydrocarbons as high as 85%. The hydroforming can be carried out either by the fixed or moving bed process or in accordance with the fluidized solid technique.

During the course of the hydroforming reaction carbonaceous deposits build up on the catalyst and consequently diminish its activity. These deposits are removed by subjecting the catalyst to combustion in an oxidizing atmosphere, i.e., air or other gas containing about 1 to 2% oxygen.

The platinum catalysts used in this process have been found to deactivate with usage for various reasons, among which are changes in the physical state of the platinum. Important factors in the latter, for example, are the increased size of the platinum crystals and the rate of platinum crystal growth. Contaminants such as other heavy metals tend to deactivate the catalyst. The deactivation resulting from these factors should be distinguished from the simpler, more easily reversible, loss of activity of the catalyst due to carbonization from the hydroforming reaction itself, or diminution in hydrocracking activity due to loss of halide which can be restored by halide addition.

Changes in the platinum crystal lattice (size of unit cell) also account to a certain extent for catalyst deactivation. Although these changes are reversible under certain conditions of operation, the severe treatment required to alter the lattice eventually leads to an agglomeration of platinum crystallites which in the past has been considered an irreversible process. Normally, therefore, "spent" platinum catalysts are processed for the extraction, separation and recovery of the platinum which is then used to prepare fresh catalyst. This is, of course, an expensive operation, because of the platinum recovery charges and the cost of manufacturing new catalysts.

This invention provides an improved method for restoring the activity and selectivity of the "spent" platinum group metal catalyst in a fixed, moving or fluid bed hydroforming process. The method comprises the combined steps of regeneration, chlorination, and rejuvenation. Regeneration is the contacting of the deactivated carbonized catalyst with an oxygen-containing gas in order to burn off carbon deposited thereon, chlorination is the contacting of the catalyst with chlorine to replenish the chlorine content of the catalyst, and rejuvenation is the exposing of the regenerated catalyst to an oxygen atmosphere at high temperatures in order to rearrange the molecular structure of the catalyst to a more active state.

Formerly, in such processes for catalyst reactivation it was necessary after regeneration of the catalyst at about 100 p.s.i.g., to depressurize the flue gas facilities and establish a once thru flow of air before chlorination could be begun. This once through flow of air was obtained by having the compressor take suction from the atmosphere and discharge through a heater into the reactor and out to the atmosphere. Chlorine was then injected into this hot air stream passing through the reactor for the desired chlorine treatment. The recirculating system following this had to be repressurized to the 100 p.s.i.g. lever before flue gas circulation for rejuvenation could be established. It was then possible to adjust the oxygen concentration of the flue gas to about 10 mol percent and its temperature to about 950–1000° F. for such rejuvenation.

By the present process the depressurization and pressurization steps are eliminated and the chlorine injection step is combined with the catalyst rejuvenation treatment.

It is thus possible to reduce reactivation cycle time from 16 to 10 hours. In addition, recirculation of chlorine treat flue gases makes it possible to obtain substantial savings in chlorine requirements for the process. Moreover, recirculation of rejuvenation flue gases permits substantial savings to be achieved through the use of smaller, simpler, regenerative type driers since less water has to be collected in the reactivation cycle. Thus the simplified procedure employing high pressure chlorination in accordance with the present invention is as follows:

(1) Regeneratively burn carbon off the catalyst at above 100 p.s.i.g. using the flue gas recirculation facilities.

(2) Increase the oxygen concentration of the flue gas stream to over 5 mol percent and its temperature to over 900° F. but less than 1050° F. thus partially rejuvenating the catalyst. This permits the system to be completely dried out before chlorine is injected. Oxygen concentration may be as high as 100 mol percent but practically it is limited to about 20 mol percent, or the concentration of air.

(3) Inject chlorine into the recirculating stream upstream of the catalyst bed and bypass the recirculating stream around the drier during this step. Limit chlorine addition rate so that the chlorine concentration in the reactor effluent will be tolerable to the recirculation facilities, say 0.1 mol percent. This value is to be determined by the materials of construction in the pipes and equipment involved, excluding the drier which is, as mentioned, by-passed during this chlorine treating step. If desired, during the chlorine addition period, the oxygen concentration in the system can be decreased or increased.

(4) Stop chlorine injection and continue to recirculate the oxygen-containing stream for the remainder of the rejuvenation period, the drier again being cut back into service.

This invention will be more fully understood by reference to the accompanying drawing illustrating a reactor undergoing reactivation in accordance with this invention. It will be understood that this reactor is but one of a bank or group of reactors through which the naphtha feed is passed successively with reheating between each reactor. Such systems are well known in the art and normally comprise three or four reactors and a "swing" reactor which is connected into the system to replace each reactor as required to permit the reactivation thereof. Since such systems are well known and form no part of the present invention, the drawing has been limited to a single reactor to simplify the description of the present invention.

The reactivation cycle is begun by shutting off the naphtha-recycle gas feed to the reactor by closing valve 4 on the inlet side and valve 5 on the outlet side of the reactor. The reactor is then depressurized from hydroforming pressure to atmospheric pressure by opening valve 6 and passing the naphtha vapors out of the system through valve line 43. Valve 7 is then opened and inert gas supplied through valve line 13 and the reactivation flue gas system is used to further purge the reactor of naphtha vapors. The pressure in the reactor is then increased to normal regeneration pressure by closing valve line 43.

Refinery air is introduced through valve line 12 and inert gas is introduced through valve line 13 in sufficient amount to increase the oxygen content in the regeneration circulating system to the desired level. This air and inert gas to be introduced to the recirculating flue gas system pass through water knockout pot 14 and line 15 to the circulating system at line 16 and through valve line 17 to drier 19. Driers 19 and 20 are operated alternately, one being regenerated while the other is on stream. To switch drier 20 on stream, valve lines 18 and 22 are opened and valve lines 17 and 21 are closed. From drier 19 the dried gases pass through valve line 21 and line 23 to compressor 24 where their pressure is raised to about 100 p.s.i.g. From compressor 24 the gases pass through line 25 to flue gas exchanger 26 and through line 27 to flue gas heater 28. From heater 28 the gases at a temperature of about 750°–1000° F. (750° F. at beginning and about 1000° F. at the end of the burn) pass through line 30, and line 31 to reactor 32 wherein regeneration of the deactivated platinum on alumina catalys takes place. From the reactor 32 the flue gases at a temperature normally not in excess of about 1050° F. pass through line 33, and line 34 to flue gas exchanger 26 where they are partially cooled before being passed through line 35 to flue gas cooler 36 for further cooling. From cooler 36 the flue gases pass through line 37 to pressure recorder control valve 38 which maintains the pressure of the flue gas system and releases flue gas to the atmosphere during regeneration. The gases then pass through flue gas final cooler 39 and line 40 to line 16 where they are joined by makeup air and inert gas supplied as previously described. It is desirable to maintain in the recirculation system in line 40 a recording chlorine analyzer with high concentration alarm 44, as shown in the diagram.

After the regeneration is complete the oxygen content of the recirculating flue gas stream is increased to about 10 mol percent by increasing the supply of refinery air through valve line 12 and the temperature of the gases leaving the flue gas heater 28 is adjusted to about 950° F. The catalyst is thus treated at about 950° F. and 100 p.s.i.g. for about one hour. This initiates the rejuvenation step and permits the system to be completely dried of the water formed during regeneration, in preparation for the chlorine treating step.

In line 16 the recycle gases join any necessary make-up gases from line 15 and pass through line 17 to drier 19 and thence through the system as in the regeneration step. During rejuvenation the gases are, however, as mentioned above, heated to the higher temperature of about 950° F. in flue gas heater 28 and are free of moisture.

After the partial rejuvenation step, chlorine is injected through line 41 into the recirculating stream at a point in line 30 which is only a short distance upstream from reactor 32, so as to minimize corrosion problems. This point of introduction of the chlorine gas is kept as near the reactor as possible. If necessary special materials capable of withstanding chlorine may be used between such point of introduction and the reactor. The rate of addition of chlorine is limited so as to produce a concentration of chlorine in the reactor effluent stream tolerable to the materials of construction in the flue gas recirculation system, excluding the drier facilities, say 0.1 mol percent chlorine. During the chlorine treat step the recirculating gases are bypassed around the driers 19 and 20 through valve line 42. During this step oxygen concentration in the system can be increased or decreased as desired.

For this final step in the reactivation of the catalyst cycle the chlorine supply is cut off, the oxygen concentration is maintained at about 10 mol percent and drier 19 is cut back into the recycle system by closing valve line 42 and reopening valves 17 and 21. Recirculation of the oxygen treating gas is continued until the desired rejuvenation treatment is complete, after which the reactor is depressurized to atmospheric pressure through valve line 43 and purged with inert gas supplied through line 13. The reactor is again brought back on stream by closing valve line 6, opening valve 4 to repressurize the reactor, and then by opening valve 5 to reestablish naphtha flow through the reactor. The advantages of the present system are:

(1) No depressurization before and repressurization after chlorine treating are required and the high temperature oxygen rejuvenation step and the chlorine treating step may be performed at the same time.

(2) Total catalyst reaction time is reduced from approximately 16 hours to 10 hours. This shorter reactivation cycle will be increasingly more important as increases in operating severity to meet predicted catalyst shortages make necessary more frequent catalyst reactivation.

(3) Chlorine treatment at high pressures and temperatures of about 950° F. results in some catalyst rejuvenation. Therefore, the improved procedure reduces the total time required for chlorine treatment and rejuvenation during the cycle.

(4) Operation of a high pressure chlorine treat step in a recirculating system results in a considerable reduction in the size of an investment for the driers in the system. Smaller and cheaper regenerative type driers can be used because less total water is collected in a reactivation cycle, and less water is removed, at each pass, from the stream of gases passing through said driers. Gases are recirculated during the first partial hot rejuvenation step for about one hour and the gases and catalyst are thus substantially dried. After the chlorine treat step the gases are again recirculated through the drier. In the old process, for a considerable part of the total activation time the air and inert gas were newly supplied to the system and had to be substantially dried in one pass through the drier.

(5) More efficient utilization of chlorine permits savings in chlorine requirements for the process. The higher pressure effects a better contacting and reaction with the catalyst and thus for a given degree of chlorine treating requires less chlorine and/or less time, and the recycle of the chlorine treat effluent gas recovers chlorine that previously was discharged from the system and lost.

(6) The process is much simpler than the conventional one and reduces the number of block valves to be opened or closed, an important point from an operating standpoint.

(7) Improved gas distribution is obtained across the reactor bed during the high pressure recirculation thus improving contacting of chlorine with the catalyst and also reducing chlorine and reaction time requirements.

(8) A higher mol percent chlorine treat gas can be economically contacted with the catalyst because of the recirculation of the chlorine in the effluent. Older processes employing once through low pressure operation could not use a higher concentration of chlorine than that concentration which would be substantially completely reacted with the catalyst and not lost with the effluent gases.

(9) The system of catalyst reactivation of the present invention can be operated at higher pressures than the 100 p.s.i.g. level described which operation may prove to be desirable to further reduce reactivation cycle time.

In order to more fully explain the invention, the following example is set forth with the understanding that it is merely illustrative of the invention and that the invention is not restricted to the specific details enumerated therein.

*Example*

A platinum alumina catalyst containing 0.6% Pt. on high surface area alumina preferably derived from aluminum alcoholate and in the form of $\frac{3}{16}''$ x $\frac{3}{32}''$ pills of a density of 47#/c.f. is used in the hydroforming of a 200/304° F. vapor temperature naphtha at a pressure of 435 p.s.i.g. and a temperature of 950° F. Four reactors are operated in series with a swing reactor replacing any one taken off stream for reactivation.

Reactivation is begun ater taking the reactor off stream, by depressurizing the reactor to atmospheric pressure and purging to remove hydrocarbon components. The catalyst is then regenerated by burning off the carbon with a mixture of air and inert gas containing about 0.5–1.5% oxygen and probably less than 15 p.p.m. water. The regeneration gas is supplied to the reactor at 750° F. and 100 p.s.i.g. Oxygen supplied to the reactor is limited so that the flue gas temperature does not exceed 1050° F. during regeneration. Regeneration is continued for about 3–4 hours or until most of the carbon has been removed from the catalyst and the temperature of the regeneration feed gases is increased during that period to about 1000° F. Excess flue gas is discharged to the atmosphere during regeneration.

After the burning of carbonaceous deposits is completed, the oxygen content of the flue gas stream is increased to about 10 mol percent and the flue gas is recirculated with the exhaust of flue gas to the atmosphere discontinued. The temperature of this treat gas entering the reactor is increased to 950° F.–1000° F., the pressure remaining at about 100 p.s.i.g. This part of the rejuvenation step continues for about one hour and substantially completely dries out the recirculating system.

Chlorine is then injected into the recirculating, dry, gas stream containing 10 mol percent oxygen, upstream of the catalyst bed at such a rate as to produce in the reactor effluent stream a chlorine concentration of no greater than 0.3 mol percent. This chlorine injection continues for approximately 1–2 hours, during which time the driers are by-passed. The total amount of chlorine charged is about 0.5–2.0 wt. percent based on the catalyst. The 950–1000° F. temperature and 100 p.s.i.g. pressure conditions used in the initial rejuvenation step are also maintained during this chlorine treatment as well as during the final rejuvenation treat step after chlorine addition has been stopped. Final rejuvenation then continues for 2–3 hours to complete the reactivation cycle. The entire reactivation cycle length as mentioned, when time to purge the reactor and swing valves is included, thus totals about 10 hours. The reactor, containing catalyst reactivated to approximately the level of fresh catalyst, is thereupon substituted for another reactor ready for reactivation and the cycle is repeated.

It is to be understood that this invention is not limited to the specific example above which has been offered merely as an illustration, and that modifications may be made without departing from the spirit of this invention.

What is claimed is:

1. An improved process for the reactivation of platinum-on-alumina hydroforming catalysts which have become deactivated by the accumulation of carbonaceous deposits thereon during the hydroforming process as well as by the agglomeration of the platinum into large crystallities of low activity, which comprises stripping the spent catalyst of hydrogen and hydrocarbon materials, regenerating the stripped catalyst by circulating flue gas containing a small amount of oxygen through the catalyst at a pressure of over about 100 p.s.i.g. thereby burning carbonaceous deposits off the catalyst at temperatures below 1050° F., withdrawing flue gases from the catalyst undergoing regeneration, passing the withdrawn flue gases through a drier to remove water formed during regeneration, recycling the dried flue gas containing a small amount of oxygen to the catalyst to complete the regeneration thereof, partially rejuvenating the regenerated catalyst by increasing the oxygen content of the dry recycle flue gas stream to over 5 mol percent, continuing the circulation of this gas stream at a temperature of at least 900° F. and at a pressure above about 100 p.s.i.g. over the catalyst and through the driers for a period of time sufficient to dry out the system and partially rejuvenate the catalyst, chlorine treating the partially rejuvenated catalyst by adding chlorine to the said recirculating rejuvenating gas stream while maintaining the pressure above about 100 p.s.i.g., bypassing such a recirculating gas stream around the driers during the chlorine addition step, discontinuing the addition of chlorine when the total amount of chlorine charged is about 0.5 to 2.0 wt. percent based on the catalyst and completing the rejuvenation of the catalyst by continuing to recirculate the oxygen-containing stream at a temperature of at least 910° F. and at a pressure above about 100 p.s.i.g., the total catalyst reactivation time being at most about 10 hours.

2. The process as defined in claim 1 wherein the chlorine is supplied during the chlorine treat step at such a rate as to produce a chlorine concentration no greater than 0.1 mol percent in the gaseous effluent from the catalyst treatment.

3. The process as defined in claim 1 wherein the pressure during the entire reactivation process is substantially constant above about 100 p.s.i.g. and wherein the approximate reactivation cycle is: regeneration 3–4 hours, partial rejuvenation 1 hour, chlorine treat 1–2 hours and final rejuvenation 2–3 hours.

4. The process as defined in claim 1 wherein the oxygen concentration during the rejuvenation steps is about 10 mol percent.

5. The process as defined in claim 1 wherein the recirculating gas stream is again passed through the driers during the final rejuvenation step.

6. The process as defined in claim 2 wherein the temperature during the chlorine treatment step is in the range of 950–1000° F.

7. The process as defined in claim 5 wherein after final rejuvenation is completed, the catalyst is depressurized to atmospheric pressure and purged with inert gas.

References Cited in the file of this patent

UNITED STATES PATENTS

| | | |
|---|---|---|
| 2,746,909 | Hemminger | May 22, 1956 |
| 2,752,288 | Voorhies et al. | June 26, 1956 |
| 2,773,014 | Snuggs et al. | Dec. 4, 1956 |
| 2,785,138 | Millikan | Mar. 12, 1957 |
| 2,785,139 | Heinemann | Mar. 12, 1957 |
| 2,819,951 | Medlin et al | Jan. 14, 1958 |

FOREIGN PATENTS

| | | |
|---|---|---|
| 167,797 | Australia | June 6, 1956 |